United States Patent [19]

Ryoke et al.

[11] Patent Number: 4,988,562

[45] Date of Patent: Jan. 29, 1991

[54] MAGNETIC RECORDING MEDIA

[75] Inventors: Katsumi Ryoke; Masatoshi Takahashi; Akihiro Hashimoto, all of Kanagawa, Japan

[73] Assignee: Fuji Photo Film Co., Ltd., Kanagawa, Japan

[21] Appl. No.: 259,366

[22] Filed: Oct. 18, 1988

[30] Foreign Application Priority Data

Oct. 19, 1987 [JP] Japan .................................. 62-264723

[51] Int. Cl.$^5$ .............................................. G11B 23/00
[52] U.S. Cl. ..................................... 428/323; 428/408; 428/694; 428/695; 428/900
[58] Field of Search ............... 428/323, 408, 694, 695, 428/900

[56] References Cited

U.S. PATENT DOCUMENTS

| | | | |
|---|---|---|---|
| 4,132,827 | 1/1979 | Mukaida et al. | 428/329 |
| 4,592,942 | 6/1986 | Nishimotsu et al. | 428/694 |
| 4,629,646 | 12/1986 | Ide et al. | 428/694 |
| 4,702,959 | 10/1987 | Shimozawa et al. | 428/694 |
| 4,731,278 | 3/1988 | Ryoke et al. | 428/694 |

Primary Examiner—Paul J. Thibodeau
Attorney, Agent, or Firm—Sughrue, Mion, Zinn, Macpeak & Seas

[57] ABSTRACT

A magnetic recording medium having excellent running properties and excellent durability is disclosed, which comprises a non-magnetic support having thereon a magnetic layer comprising a ferromagnetic powder and carbon black, said carbon black being a mixture which contains high structure furnace carbon black and acetylene black in the weight ratio of the former to the latter of from 95:5 to 45:55, and said high structure furnace carbon black having properties satisfying the general equations (I) or (II) below:

$$0 < X \leq 120, \ Y \geq 0.625X + 75 \quad \text{(I)}$$

$$X > 120, \ Y \leq 0.01125X^2 - 2.005X + 229 \quad \text{(II)}$$

wherein Y is the amount of DBP oil absorbed (Ml/100 grams) by said high structure carbon furnace black, X is the specific surface area (m$^2$/gram) of said high structure carbon furnace black, and Y $\geq$ 120, wherein W is the amount of DBP oil adsorbed (ml/100 grams) by said actylene black, Z is the specific surface area (m$^2$/gram) of said acetylene black, and W $\geq$ 120.

6 Claims, No Drawings

MAGNETIC RECORDING MEDIA

FIELD OF THE INVENTION

This invention relates to a magnetic recording medium having a magnetic layer on a non-magnetic support.

BACKGROUND OF THE INVENTION

Magnetic recording media, having on a non-magnetic support a magnetic layer comprising a dispersion in a binding agent (binder) of a ferromagnetic powder consisting of needle shaped crystals of $\gamma$-$Fe_2O_3$, Co-containing magnetic iron oxide, $CrO_2$ etc., have been used in general as magnetic recording media (also referred to below as magnetic tapes) in audio, video and computer applications.

Magnetic recording media of this type can be recorded at higher densities if the surface of the magnetic layer is made smoother when forming the magnetic layer and it is known that this improvement enhances the electromagnetic conversion characteristics of the magnetic recording medium.

However, if the surface of the magnetic layer is made smoother, then the coefficient of friction for the contact between the magnetic layer and the apparatus while a video tape is being run is increased and consequently the magnetic layer of the magnetic recording medium is liable to be damaged in use over a short period of time. Furthermore, the magnetic layer may tend to peel away.

With video tapes in particular, the recording medium is typically run at a high speed while in contact with the video head. Due to the high friction thus created, ferromagnetic dust is liable to be shed from the magnetic layer and this results in blocking of the video head. Hence, improvement of the running durability of the magnetic layers of video tapes is clearly desirable.

In the past, methods in which polishing materials (hard particles) such as corundum, silicon carbide, chromium oxide etc. are added to the magnetic layer have been proposed as a means of improving the running durability of magnetic layers. But when polishing materials are added to a magnetic layer with a view to improving running durability, the materials must be added in large amounts or it is difficult to achieve any effect. However, magnetic layers to which large amounts of polishing materials have been added result in pronounced wearing of the magnetic heads etc. Furthermore, since adding large amounts of such materials also adversely affects the smoothing of the magnetic layer and the electromagnetic conversion characteristics, this method is undesirable.

Fatty acids, or esters of fatty acids and aliphatic alcohols, have been added to magnetic layers as lubricants in order to reduce to coefficient of friction. However, adding large amounts of lubricant to increase the lubricating effect reduces the S/N ratio, and further this practice has an adverse effect on permalloy heads while it has a good effect on stainless guides. For this reason, it is difficult to achieve a balanced running performance with such additives.

Carbon black has long been included in the magnetic layers of magnetic recording media of this type as described in U.S. Patents 4,614,685 and 4,539,257, principally with a view to preventing the build-up of static. Inclusion of carbon black is also known to have an effect on the running durability. However, magnetic layers which contain carbon black have poor surface smoothness and, in the case of video tapes in particular where high density recording is essential, there is a marked tendency for the electromagnetic conversion characteristics to deteriorate as the amount of carbon black added is increased. Furthermore, in the case of audio tapes, magnetic layers which contain large amounts of carbon black have a lower degree of packing of magnetic particles within the magnetic layer, and therefore there is a deterioration in the electromagnetic conversion characteristics as described earlier. However, magnetic layers which do not contain carbon black have no anti-static effect and so their durability is very poor.

Hence, sufficiently good running durability cannot be obtained using the conventional lubricants, polishing materials and carbon black.

SUMMARY OF THE INVENTION

An object of the present invention is to provide a magnetic recording medium which has excellent running properties and excellent running durability.

A further object of this invention is to provide a magnetic recording medium which has a low coefficient of friction and an excellent S/N ratio.

Accordingly the present invention provides a magnetic recording medium comprising a non-magnetic support having thereon a magnetic layer comprising a ferromagnetic powder and carbon black, said carbon black being a mixture which contains high structure furnace carbon black and acetylene black in the weight ratio of the former to the latter of from 95:5 to 45:55, and said high structure furnace carbon black satisfying the general equations (I) or (II) below.

$$0 < X \leq 120, \quad Y \geq 0.625X + 75$$

$$X > 120, \quad Y \geq 0.01125X^2 - 2.005X + 229$$

wherein Y is the amount of dibutyl phthalate (DBP) oil adsorbed (m$\lambda$/100 grams) by said high structure furnace carbon black, X is the specific surface area (m$^2$/gram) of said high structure furnace carbon black, and $Y \geq 120$.

DETAILED DESCRIPTION OF THE INVENTION

In the present invention, the amount of DBP oil absorbed is the amount in m$\lambda$ of DBP required to form a stiff past on milling with 100 grams of carbon black. Furthermore, this amount is measured in accordance with the method set forth for testing carbon black for use in rubber in JIS K-6221-1982.

The specific surface area of the high structure furnace carbon black is measured using an electron *Carbon Black Binran* (*Carbon Black Handbook*), edited by Carbon Black Association, 3rd edition, pp. 176–179 (1973), and H.K. Livingston, *Journal of Colloid Science*, Vol. 4, p. 450 (1949). The method comprises taking a picture of a dispersion of carbon black using a transmission type electron microscope, for example, with magnification of 20,000, enlarging the picture 5 times large (i.e., magnification of 100,000) and examining distribution of the particle size of the carbon black using a particle size analyzer (e.g., produced by Carl Zeiss Co.), and an average particle size ($d_A$) and the specific surface area ($S_{EM}$) are calculated from the following equations $\rho$ $$d_A = \Sigma n_i d_i^3 / \Sigma n_i d_i^2$$

$$S_{EM} = 6/\rho \cdot d_A$$

wherein $n_i$ is the number of particles having a particle size ($d_i$) and $\rho$ is the specific gravity of carbon black, i.e., 1.86.

The magnetic recording medium of this invention, by using carbon black of the specified composition as indicated above in a specified proportion, provides a magnetic layer which is tough and which has a low coefficient of friction. That is to say, the compatibility of the carbon black and a binding agent is improved by including a high structure furnace carbon black. This improvement results in a tougher magnetic layer which has a higher S/N ratio. Furthermore, the magnetic layer surface has the appropriate roughness due to the acetylene black, thus lowering the coefficient of friction ($\mu$ value) of the magnetic layer surface with respect to the parts of the running system.

Hence, it is possible to obtain magnetic recording media of this invention which have a superior S/N ratio and improved running properties and running durability, by using effectively the distinguishing features of the respective carbon blacks in the proportions specified above.

The magnetic recording medium of this invention has a basic structure comprising a magnetic layer on a non-magnetic support where the magnetic layer contains ferromagnetic powder.

The non-magnetic support used in the invention may be a synthetic resin film made of polyethyleneterephthalate, polypropylene, polycarbonate, polyethylenenaphthalate, polyamide, polyamideimide, polyimide etc., or a metal foil, such as an aluminum foil, stainless steel foil etc. Furthermore, the non-magnetic support is generally of a thickness of from 2.5 to 100 $\mu$m, and preferably of a thickness of from 3 to 80 $\mu$m.

The support may have a back layer (backing layer) on the side opposite that side of the support which has the magnetic layer.

The high structure furnace carbon black used in the present invention is, in general, selected from those which satisfy the above mentioned general equations (I) and (II) and have a structure index of at least 150. The structure index mentioned here is that described in *The Rubber Age*, Vol 55, pp. 469–478, (1944).

The high structure furnace carbon black and the acetylene black are described in detail in the aforesaid *Carbon Black Binran* (Carbon Black Handbook), p. 170 and p. 104, respectively.

High structure furnace carbon blacks of this type have a high affinity for the binding agent from which the magnetic layer is formed and, because of the complex, branched structure of these types of carbon blacks, magnetic layers which contain them are tough. Consequently, the magnetic recording media obtained have a good S/N ratio but their running properties are poor. On the other hand, acetylene blacks are easily dispersed but they have a low affinity for binding agents and so a magnetic layer which contains acetylene black has an appropriate surface roughness and a low coefficient of friction ($\mu$ value). However, in the case of the use of acetylene black, there is no beneficial effect on the S/N ratio.

The investigations carried out by the inventors demonstrated it was possible to obtain a magnetic recording medium which had superior running properties and S/N ratios by using the two types of carbon black as defined by the properties necessary to satisfy general equations (I) and (II). Furthermore, the compounding proportions of the thusly defined two types of carbon black are such that the ratio by weight of the high structure furnace carbon to the acetylene black must be within the range from 95:5 to 45:55, and it is preferably within the range from 90:10 to 70:30.

Furthermore, a water content (determined by the Karl Fischer method) of 1 gram or less per 100 grams in total of said high structure furnace carbon black and said acetylene black is preferred in view of the increased dispersibility achieved thereby.

Furthermore, the above mentioned acetylene black, like the high structure furnace carbon black, preferably satisfies the general equations (III) and (IV) below, in view of the improvement in running properties achieved thereby:

$$0 < Z \leq 120, \ W \geq 0.625Z + 75$$

$$Z > 120, \ W \geq 0.01125Z^2 - 2.005Z + 229$$

wherein W is the amount of DBP oil absorbed (m$\lambda$/100 gram) of the said acetylene black, Z is the specific surface area (m$^2$/gram) of the said acetylene black, and $W \geq 120$.

Hence, in a magnetic recording medium of this invention in which these two types of carbon black have been used, the magnetic layer is tough and has an excellent S/N ratio and, moreover, it has a low coefficient of friction value) and the magnetic recording medium clearly has excellent running durability.

No limitation is imposed upon the above mentioned high structure furnace carbons and acetylene blacks provided that their properties lie within the aforementioned specified ranges. Carbon blacks which satisfy the above mentioned specifications can be obtained as commercial products and these can be used as purchased. For example, "Vulcan XC-72" (made by the Cabot Co.) can be used for the above mentioned high structure furnace carbon and HS-100 (made by the Denki Kagaku Kogyo Co.) can be used for the above-mentioned acetylene black.

The magnetic layer of the magnetic recording medium of this invention preferably contains a total amount of the above-mentioned carbon blacks within the range from 1 to 20 parts by weight, more preferably from 1 to 10 parts by weight, most preferably from 3 to 6 parts by weight, per 100 parts by weight of ferromagnetic powder.

Furnace blacks and thermal blacks intended for use in rubber, and blacks intended for coloring purposes, can be used as well as the carbon blacks specified above in this invention. Actual examples of names given to these carbon blacks in the United State include SAF, ISAF, IISAF, T, HAF, SPF, FF, EFF, HMF, GPF, APF, SRF, MPF, ECF, SCF, CF, FT, MT, HCC, HCF, MCF, LFF, RCF etc., and those classified by the American Standard ASTM D-1765-82a can be used. The average particle size of these carbon blacks which can be used in the invention is from 5 to 1,000 m$\lambda$ (as measured by an electron microscope). Their specific surface area (S BET) with a nitrogen adsorption method is from 1 to 900 m$^2$/grams. The pH of the carbon black is from 3 to 11 (using the method of JIS K-6221-1982) and the amount of DBP oil absorbed is from 10 to 900 m$\lambda$/100 grams (using the method of JIS K-

6221-1982). Furthermore, these carbon blacks may be subjected to a surface treatment with a dispersing agent as described hereinafter, or they may be used after grafting with a resin. Furthermore, carbons in which part of the surface has been graphitized by raising the temperature in the furnace above 2,000° C. during the manufacture of the carbon black can also be used in the invention. Moreover, hollow carbon blacks can be used as special carbon blacks. The total amount of the aforementioned carbon blacks of this invention and the above mentioned carbon blacks which can be used is preferably within the range of from 1 to 20 parts by weight, more preferably from 1 to 10 parts by weight, most preferably from 3 to 6 parts by weight, per 100 parts by weight of ferromagnetic powder. These blacks also function as anti-static agent.

No particular limitation is imposed upon the ferromagnetic powder which is used in the invention. Ferromagnetic metal alloy powders, fine ferromagnetic metal powders of which the main component is iron, metal oxide such as $\gamma$-$Fe_2O_3$ and $Fe_3O_4$ based metal powders and modified metal oxide based ferromagnetic powders such as Co modified iron oxide, modified barium ferrite, moidified strontium ferrite, etc. are examples of such ferromagnetic powders. The acircular ratio of the above mentioned ferromagnetic powder is generally from 1/1 to 50/1 and preferably at least 5/1. The average particle size is within the range from 0.01 to 1.0 $\mu$m and the specific surface area (S BET) of the ferromagnetic powder is from 20 to 70 $m^2$/gram.

Furthermore, with the above mentioned barium ferrites, the average particle diameter is within the range from 0.001 to 1.0 $\mu$m and the thickness is from one half to one twentieth of the diameter. The density of barium ferrite is from 4 to 6 grams/cc and the specific surface area (S BET) is from 20 to 70 $m^2$/gram.

The specific surface area (S BET) is measured in accordance with the method disclosed by S. Brunauer, P.H. Emmett and E. Teller, *Journal of the American Chemical Society*, Vol. 60, pp. 309, (1938); in Vol. 59, pp. 310, 1533 and 2682, (1937); and in Vol. 57, pp. 1754, (1935).

Examples of the above mentioned fine ferromagnetic powders include those in which the metal fraction of the fine ferromagnetic powder is at least 75 wt%, and ferromagnetic metals or alloys which have a metal fraction of at least 80 wt% (for example Fe, Co, Ni, Fe-Co, Fe-Ni, Co-Ni, Co-Ni-Fe), and alloys which contain other components (for example Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P) in a range of up to 20 wt% with respect to the said metal fraction. Furthermore, the above mentioned ferromagnetic metal fraction may contain a small amount of water, hydroxide or oxide. Methods used for the manufacture of these ferromagnetic metal powders are well known and the ferromagnetic powders used in this invention can be manufactured using these known methods.

No particular limitation is imposed on the form of the ferromagnetic powder which is used, but particles which have a needle-like, granular, rice-like, rice grain-like or tabular form are normally used.

Thermoplastic resins, thermoset resins and reactive type resins etc. can be used as binding agents when forming magnetic layers of this invention, and these resins may be used individually or in the form of mixtures.

In general, resins of average molecular weight from 10,000 to 200,000 with a degree of polymerization of approximately 200 to 2,000 can be used as thermoplastic resins.

Examples of such thermoplastic resins include vinyl chloride/vinyl acetate copolymers (for example vinyl chloride/vinyl acetate copolymers, vinyl chloride/vinyl acetate/vinyl alcohol copolymers and vinyl chloride/vinyl acetate/maleic acid copolymers), vinyl chloride/vinylidene chloride copolymers, acrylic resins (for example vinyl chloride/acrylonitrile copolymers, vinylidene chloride/acrylonitrile copolymers, (meth)acrylic acid ester/acrylonitrile copolymers, (meth)acrylic acid ester/vinylidene chloride copolymers, (meth)acrylic acid ester/styrene copolymers, butadiene/ acrylonitrile copolymers (the term "(meth)acrylic" used herein means "acrylic or methacrylic")), cellulose derivatives (for example cellulose acetate butyrate, cellulose diacetate, cellulose triacetate, cellulose propionate, cellulose acetate propionate, nitrocellulose, cellulose acetate), various synthetic rubber based thermoplastic resins (polybutadiene, chloroprene, polyisoprene, styrene/butadiene copolymers), polyurethane resins, poly(vinyl fluoride), polyamide resins, poly(vinyl butyrate)), styrene/butadiene copolymers, and polystyrene resins etc., and these thermoplastic resins may be used individually or in the form of mixtures.

Resins of average molecular weight less than 200,000 in the coating liquid state are generally used for thermoset resins or reactive type resins and those resins of which the molecular weight becomes more or less infinite due to a condensation reaction or an addition reaction after coating can be used. However, in cases where the resins are cured by heating, those which do not soften or melt as a result of the heating which is imposed during the curing process are preferred. Examples of such resins include phenol/formaldehyde novolak resins, phenol/formaldehyde resol resins, phenol/furfural resins, xylene/formaldehyde resins, urea resins, melamine resins, drying oil modified alkyd resins, phenol rein modified alkyd resins, maleic acid resin modified alkyd resins, unsaturated polyester resins, combinations of epoxy resins and hardeners (for example, polyamines, acid anhydrides, polyamide resins), terminal isocyanate polyether wet curable type resins, polyisocyanate prepolymers (for example, compounds which have at least three isocyanate groups within the molecule, being reaction products of diisocyanates and low molecular weight triols, and trimers or tetramers of diisocyanates) and combinations of polyisocyanate prepolymers and resins which have active hydrogen atoms (for example, polyesterpolyols, polyetherpolyols, acrylic acid copolymers, maleic acid copolymers, 2-hydroxyethyl methacrylate copolymers, p-hydroxystyrene copolymers), and these can be used individually or in the form of mixtures. Preferably, the use of vinyl chloride/vinyl acetate copolymer and polyurethane resin mixtures and such mixtures to which cellulose derivatives etc. are added as the binding agent. Moreover, at least one type of group selected from among acidic groups (such as carboxylic acid, sulfinic acid, sulfonic acid, phosphoric acid, sulfate ester group, phosphate ester group etc.,) amphoteric groups (such as amino acids, aminosulfonic acids, aminoalcohol sulfate or phosphate esters, alkylbetines etc.), amino group, imino group, imido group, amido group, hydroxyl group, alkoxyl group, thiol group, halogen group, silyl group, and siloxyl group is normally included as well as the principal polar group in the molecules of the above mentioned resins, and the inclusion of the respective polar groups at a rate within the range of from $1\times10^{-6}$ to $1\times10^{-3}$ equivalents per gram of resin is desirable from the points of view of both the dispersibility and the durability of the magnetic layer. Of these groups, the incorporation of the —$SO_3Na$ group, the —COOH group, the —$OPO_3Na$ group or the amino group is preferred.

The binding agents are used in an amount of from 10 to 100 parts by weight, and preferably of from 15 to 50 parts by weight, per 100 parts by weight of the ferromagnetic powder.

Desirably, inorganic particles of which the Mohs' hardness is at least 5 is included in the magnetic layer of a magnetic recording material of this invention.

There is no limitation on the inorganic particles which can be used except that they should have a Mohs' hardness of at least 5. Examples of particles of which the Mohs' hardness is at least 5 include $Al_2O_3$ (Mohs' hardness 9), $TiO_2$ (Mohs' hardness 6.5), SiOhd 2 (Mohs' hardness 7), $SnO_2$ (Mohs' hardness 6.5) $Cr_2O_3$ (Mohs' hardness 9) and $\alpha$-$FE_2O_3$ (Mohs' hardness 5.5).

The preferred inorganic particles are those which have a Mohs' hardness of at least 8. If comparatively soft inorganic particles which have a Mohs' hardness of less than 5 are used, they are liable to be shed from the magnetic layer and head blockage is liable to occur since there is virtually no polishing effect on the head, and the running durability is also poor.

The inorganic particle content is normally within the range from 0.1 to 20 parts by weight, and preferably within the range from 1 to 10 parts by weight, per 100 parts by weight of the ferromagnetic powder.

A method for the manufacture of a magnetic recording medium of this invention where the aforementioned carbon blacks are added to a magnetic coating composition is described below.

When manufacturing the magnetic layer of a magnetic recording medium of this invention it is usual to form a magnetic paint by milling the ferromagnetic powder and binding agent with the aforementioned carbon blacks and the abrasives and other fillers etc. as required, together with a solvent.

The solvents normally used to form magnetic coating compositions, for example, methyl ethyl ketone etc., can be used as the solvent which is used during the milling process.

No particular limitation is placed on the method of milling provided that it can normally be used to prepare magnetic coating composition, and the order for the addition of the various components can be established suitably.

The usual milling machines, for example, a two roll mill, three roll mill, ball mill, pebble mill, toron mill, side grinder, Segbary attriter, high speed impeller dispersion machine, high speed stone mill, high speed impact mill, disper, kneader, high speed mixer, homogenizer or an ultrasonic dispersing machine etc., can be used to prepare the magnetic coating composition.

In preparation of the magnetic coating composition, known additives such as dispersing agents, anti-static agents and antioxidants etc. can be added alone or in combination.

The known dispersing agents such as the metal soaps consisting of the alkali metal (for example, lithium, sodium and potassium) or alkaline earth metal (for example, magnesium, calcium and barium) and fatty acids which have from 12 to 18 carbon atom (for example, caprylic acid, capric acid, lauric acid, myristic acid, palmitic acid, stearic acid, oleic acid, elaidic acid, linolic acid, linolenic acid and stearolic acid), and compounds in which some or all of the hydrogen in these compounds has been replaced by fluorine atoms, the amides of the above mentioned fatty acid, aliphatic amines, higher alcohols, polyalkyleneoxidealkyl phosphate esters, alkyl phosphate esters, alkyl borate esters, sarcosinates, alkylether esters, trialkyl polyolefinoxy quaternary ammonium salts and lecithin etc. can be used as dispersing agents. When a dispersing agent is used, it is normally included at a rate of from 0.1 to 10 parts by weight per 100 parts by weight of the binding agent which is being used.

Natural surfactants such as saponin etc., non-ionic surfactants such as the alkyleneoxide, glycerine and glycidol based surfactants, cationic surfactants such as higher alkylamines, quaternary ammonium salts, salts of pyridine and other heterocyclic compounds, phosphonium compounds and sulfonium compounds etc., anionic surfactants which contain an acid group, such as carboxylic acids, sulfonic acids, phosphoric acids, sulfate ester groups, phosphate ester groups etc., and amphoteric active agents such as amino acids, aminosulfonic acids, and the sulfate or phosphate esters of amino alcohols etc., can be used as anti-static agents. When the above mentioned fine electrically conductive powders ar used as anti-static agents they are used, for example, at a rate within the range from 0.1 to 10 parts by weight per 100 parts by weight of the binding agent, and when the surfactants are used for this purpose they are used in an amount within the range from 0.12 to 10 parts by weight per 100 parts by weight of the binding agent.

Furthermore, the known solid lubricants, such as fine graphite powder, fine molybdenum disulfide powder, fine teflon powder etc., or small amounts of higher alcohols, sobitane oleate, mineral oils, animal and vegetable oils, low olefin polymers and low $\alpha$-olefin polymers etc. can be used alone or in combination as lubricants.

Moreover, heterocyclic compounds and hetero compounds, such as benzotriazine, benzothiazole, benzodiazine, tetrazaindene, EDTA etc., can be used as antioxidants.

Moreover, the additives such as the dispersing agents and anti-static agents described above are not limited to having just the effect described and, for example, a dispersing agent can also be used as an antistatic agent. Hence, the effect of a compound indicated in the above classifications is not limited to just the classification under which it is listed. Furthermore, the amount of a substance which has a plurality of actions which is added is determined in conjunction with the various effects of that substance.

The magnetic coating composition which has been prepared in this way is coated onto the non-magnetic support as described earlier. The coating can be carried out directly onto the aforementioned non-magnetic support or the magnetic paint can be coated onto the non-magnetic support via an adhesive layer for example.

Air doctor coating, blade coating, rod coating, extrusion coating, air knife coating, squeeze coating, dip coating, reverse roll coating, transfer roll coating, gravure coating, kiss coating, cast coating, spray coating and spin coating etc. can be used for coating the non-magnetic support, and other methods besides these methods can also be used. The thickness of the magnetic layer coated in this way is, after drying generally within the range from about 0.5 to 10 μm, and the thickness of the dry coating is normally within the range from 1.5 to 7.0 μm.

When the magnetic layer which has been coated onto the non-magnetic support is to be used as a magnetic recording tape, the layer is normally dried after carrying out a process in which the ferromagnetic powder in the magnetic layer is orientated, i.e., after carrying out a magnetic field orientation process. furhtermore, the surface can be subjected to a smoothing treatment as required. The magnetic recording medium which has been subjected to any surface smoothing process is then cut up into the prescribed form.

Examples of the invention and comparative examples are shown below. However, the present invention is not to be construed as being limited thereto. In these examples the term "parts" signifies "parts by weight".

EXAMPLE 1

The coating composition used for forming the magnetic layer indicated below was prepared by milling and dispersing for a period of 48 hours using a ball mill, after which 20 parts of polyisocyanate ("Barnock D-802", made by the Dainippon Ink and Chemicals) was added and, after milling for a further period of 1 hour the paint was filtered through a filter which had an average pore diameter of 1 μm to provide the composition for forming the magnetic layer. The composition so obtained was coated using a reverse roll onto the surface of a polyethyleneterephthalate support of thickness 13 μm in such a way as to provide a magnetic layer of thickness, after drying, of 3.0 μm.

The non-magnetic support which had been coated with the composition used for forming the magnetic layer was subjected to a magnetic field orientating process with a magnet of 3,000 gauss in the state where the composition used to form the magnetic layer had not yet dried.

| Composition Used to Form the Magnetic Layer | |
|---|---|
| Co-containing γ-Fe$_2$O$_3$ powder (Nitrogen) absorption specific surface area: 50 m$^2$/g, Powder Hc: 900 Oe) | 300 parts |
| Vinyl chloride/vinylidene chloride copolymer (VMCH, made by the Union carbide Co.) | 15 parts |
| Polyurethane resin (containing 5 × 10$^{-3}$ equivalents/gram of phosphoric acid group, number average molecular weight: 55,000) | 25 parts |
| Carbon black A ("Vulcan XC-72", made by Cabot Co., amount of DBP oil absorbed: 185 ml/100 grams, specific surface area: 100 m$^2$/gram, structure index: 190) | 10.8 parts |
| Carbon black B ("HS-100, made by the Denki Kagaku Kogyo Co., amount of DBP oil absorbed: 180 ml/100 grams, specific surface area: 50 m$^2$/gram, structure index: 250) | 1.2 parts |
| Lecithin | 1 part |
| Oleic acid | 1 part |
| Octyl laurate | 1 part |
| Lauric aicd | 1 part |
| Butyl acetate | 700 parts |
| Methyl ethyl ketone | 300 parts |

Moreover, the above mentioned carbon black A signifies a high structure furnace carbon and carbon black B signifies an acetylene black.

After milling and dispersing the composition for forming a backing layer as indicated below for 48 hours in a ball mill, 10 parts of polyisocyanate ("Coronate-2061", made by the Nippon Polyurethane Co.) was added and, after milling for a further period of 1 hour the composition was filtered through a filter of average pore size 1 μm to provide a paint for forming a backing layer. The composition for forming a backing layer so obtained was coated using a reverse roll onto the opposite surface to that on which the magnetic layer had been formed of the polyethyleneterephthalate support of thickness 13 μm so as to provide a backing layer of thickness, after drying, of 0.6 μm.

Moreover, after drying and carrying out a super calendaring process, the material was cut into strips of width 1 inch to provide video tapes.

| Composition Used to Form the Baking Layer | |
|---|---|
| Carbon back (average particle size: 250 μm, "Raven MTP", made by the Columbia Carbon Co.) | 100 parts |
| Polyurethane resin ("Esten 5707-F1", made by the Goodrich Co.) | 60 parts |
| Phenoxy resin (PKHH, made by the Union Carbide Co.) | 30 parts |
| Copper oleate | 0.1 part |
| Stearic acid | 0.5 part |
| Methyl ethyl ketone | 700 parts |
| Cyclohexanone | 300 parts |

EXAMPLE 2

A video tape was prepared in the same way as in Example 1 except that ht 10.8 parts of carbon black A used in Example 1 was replaced by 9.6 parts, and the 1.2 parts of carbon black B was replaced by 2.4 parts.

EXAMPLE 3

A video tape was prepared int he same way as in Example 1 except that the 10.8 parts of carbon black A used in Example 1 was replaced by 6.0 parts, and the 1.2 parts of carbon black B was replaced by 6.0 parts.

EXAMPLE 4

A video tape was prepared int he same way as in Example 1 except that the polyisocyanate "Barnock D-802" (made by the Dainippon Ink and Chemicals) used in Example 1 was replaced by "Coronate 3040" (polyisocyanate made by the Nippon Polyurethane Co.)

EXAMPLE 5

A video tape was prepared in the same way as in Example 2 except that the polyisocyanate "Barnock D-802" (made by the Dainippon Ink and Chemicals) used in Example 2 was replaced by "Coronate 3040" (made by the Nippon Polyurethane Co.)

EXAMPLE 6

A video tape was prepared int he same way as in Example 3 except that the polyisocyanate "Barnock D-802" (made by the Dainippon Ink and Chemicals) used in Example 3 was replaced by "Coronate 3040" (made by the Nippon Polyurethane Co.)

COMPARATIVE EXAMPLE 1

Video tape was made in the same way as in Example 1 except that no carbon black B, just 12 parts of the carbon black A used in Example 1 was used.

COMPARATIVE EXAMPLE 2

Video tape was made int he same way as in Example 1 except that no carbon black A, just 12 parts of the carbon black B used in Example 1 was used.

COMPARATIVE EXAMPLE 3

Video tape was made in the same way as in comparative Example 1 except that "Coronate 3040" (made by the Nippon Polyurethane Co.) was used in place of the polyisocyanate "Barnock D-802" (made by the Dainippon Ink and Chemicals) used in Comparative Example 1.

COMPARATIVE EXAMPLE 4

Video tape was made in the same way as in Comparative Example 2 except that "Coronate 3040" (made by the Nippon Polyurethane Co.) was used in place of the polyisocyanate "Barnock D-802" (made by the Dainippon Ink and Chemicals) used in Comparative Example 2.

The properties of the video tapes obtained in the ways indicated above were evaluated using the methods indicated below.

Methods of Evaluation

Chroma-S/N (referred to as "C-S/N" in Table 1)

A picture signal 30 IRE video signal superimposed on a chrominance sub-carrier wave of 100% amplitude was recorded with a standard picture recording current using the video tapes obtained in the ways described above. The signals were played back and the color signal noise AM component of the played back signal after passing through a 1 MHz high pass filter and a 500 kHz low pass filter was measured using a noise measuring machine. The difference between the measured value obtained and that of the video tape prepared in Example 1 (as a standard value) was then expressed in dB.

VTR Running Tension

Tape running tensions are produced on the cylinder input side and the cylinder output side when a tape is running using a BVH-500 VTR made by the Sony Co. and the latter tension was measured. The tape used had been run for 100 passes under conditions of high relative humidity (20° C., 70% RH).

The results obtained in these measurement were as shown in Table 1.

TABLE 1

| | Carbon Black | | VTR Running | |
|---|---|---|---|---|
| | A (parts) | B (parts) | C-S/N (dB) | Tension (grams) |
| Example | | | | |
| 1 | 10.8 | 1.2 | 0 | 250 |
| 2 | 9.6 | 2.4 | −0.4 | 250 |
| 3 | 6.0 | 6.0 | −1.0 | 250 |
| 4 | 10.8 | 1.2 | +0.2 | 270 |
| 5 | 9.6 | 2.4 | 0 | 260 |
| 6 | 6.0 | 6.0 | −0.6 | 260 |
| Comparative Example | | | | |
| 1 | 12.0 | — | 0 | 400 |
| 2 | — | 12.0 | <1.6 | 250 |
| 3 | 12.0 | — | +0.4 | 400 |
| 4 | — | 12.0 | −1.5 | 260 |

It is clear from the Examples shown in Table 1 that the magnetic recording media of this invention have excellent performance in respect of chroma-S/N and VTR running tension. With Comparative Examples 1 and 3 in which only high structure furnace carbon black was used, the VTR running tension was high and in Comparative Examples 2 and 4 in which only acetylene black was used the chroma-S/N ratio was clearly low.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer comprising a ferromagnetic powder, a binder and carbon black, said carbon black being a mixture which contains high structure furnace carbon black and acetylene black in the weight ratio of the former to the latter of from 90/10 to 70/30, said high structure furnace carbon black having properties satisfying the general equations (I) or (II) below:

$$0 < X \leq 120, \quad Y \geq 0.625X + 75 \tag{I}$$

$$X > 120, \quad Y \geq 0.01125X^2 - 2.005X + 229 \tag{II}$$

wherein Y is the amount of DBP oil adsorbed (Ml/100 grams) by said high structure carbon furnace black, X is the specific surface area (m$^2$/gram) of said high structure carbon furnace black, Y $\geq$ 120, and said acetylene black has properties satisfying the general equations (III) and (IV) below:

$$0 < Z \leq 120, \quad W \geq 0.625Z + 75 \tag{III}$$

$$Z > 120, \quad W \geq 0.01125Z^2 - 2.005Z + 229 \tag{IV}$$

wherein W is the amount of DBP oil adsorbed (ml/100 grams) by said acetylene black, Z is the specific surface area (m$^2$/gram) of said acetylene black, and W $\geq$ 120.

2. A magnetic recording medium as in claim 1, wherein the water content of said carbon black is not more than 1 gram per 100 grams of total of said carbon black.

3. A magnetic recording medium as in claim 1, wherein said magnetic layer contains carbon black in total in an amount of from 1 to 20 parts by weight per 100 parts by weight of ferromagnetic powder.

4. A magnetic recording medium as in claim 1, wherein the binder is contained in an amount of from 15 to 50 parts by weight per 100 parts by weight of the ferromagnetic powder.

5. A magnetic recording medium as in claim 1, wherein the binder has a polar group selected from —SO$_3$Na, —COOH, —OPO$_3$Na and an amino group in an amount of $1 \times 10^{-6}$ to $1 \times 10^{-3}$ eq./g of the binder.

6. A magnetic recording medium as in claim 1, wherein carbon black consists of a mixture consisting of high structure furnace black and acetylene black.

* * * * *